US012619716B2

(12) United States Patent
Trigano et al.

(10) Patent No.: US 12,619,716 B2
(45) Date of Patent: May 5, 2026

(54) MULTIVARIATE THREAT DETECTION FOR A CI/CD PIPELINE

(71) Applicant: Microsoft Technology Licensing, LLC, Redmond, WA (US)

(72) Inventors: David Trigano, Tel Aviv (IL); Moshe Israel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 106 days.

(21) Appl. No.: 18/398,109

(22) Filed: Dec. 27, 2023

(65) Prior Publication Data

US 2025/0217480 A1 Jul. 3, 2025

(51) Int. Cl.
*G06F 21/55* (2013.01)
*G06F 21/54* (2013.01)

(52) U.S. Cl.
CPC ............ *G06F 21/554* (2013.01); *G06F 21/54* (2013.01); *G06F 21/552* (2013.01)

(58) Field of Classification Search
CPC ...... G06F 21/554; G06F 21/54; G06F 21/552; H04L 63/1416
USPC ........................................................ 726/22
See application file for complete search history.

(56) References Cited

U.S. PATENT DOCUMENTS

| | | | | |
|---|---|---|---|---|
| 12,126,643 B1 * | 10/2024 | Skarphedinsson | | H04L 63/1441 |
| 2021/0141718 A1 * | 5/2021 | Sandhu | | G06F 8/60 |
| 2022/0222335 A1 * | 7/2022 | Bosch | | G06F 21/57 |
| 2023/0032686 A1 * | 2/2023 | Williams | | G06F 16/9535 |
| 2023/0275917 A1 * | 8/2023 | Karmali | | G06F 16/9537 |
| | | | | 709/224 |

OTHER PUBLICATIONS

"AI Plan—Process to plan for AI adoption", Retrieved from the Internet: «https://learn.microsoft.com/en-us/azure/cloud-adoption-framework/scenarios/ai/plan», Apr. 9, 2025, 6 Pages.
"DevSecOps Tools" Retrieved from the Internet: «https://www.atlassian.com/devops/devops-tools/devsecops-tools», Jun. 10, 2025, 12 Pages.
"Enhancing Cybersecurity through AI: A Look into the Future", Retrieved from the Internet: «https://www.isc2.org/Insights/2023/09/Enhancing-Cybersecurity-through-AI-A-Look-into-the-Future», Sep. 19, 2023, 6 Pages.
"What is the CI/CD Pipeline?", Retrieved from the Internet: «https://www.paloaltonetworks.com/cyberpedia/what-is-the-ci-cd-pipeline-and-ci-cd-security», Jun. 10, 2025, 23 Pages.

(Continued)

*Primary Examiner* — Meng Vang
(74) *Attorney, Agent, or Firm* — Barta Jones, PLLC

(57) ABSTRACT

Example solutions protect a continuous integration/continuous deployment (CI/CD) pipeline. Examples collect data from a CI/CD pipeline execution data source and/or a CI/CD pipeline task data source. Based on the collected data, a feature group comprising a plurality of records is created. Each record in the feature group represents an execution of the CI/CD pipeline. An anomaly score is generated, using a model representing historical feature groups, for the feature group representing the execution of the CI/CD pipeline. If the anomaly score is above a threshold, an alert is generated to indicate that the collected data represents an anomalous activity.

20 Claims, 4 Drawing Sheets

(56) References Cited

OTHER PUBLICATIONS

Steidl, et al., "The pipeline for the continuous development of artificial intelligence models—Current state of research and practice", Retrieved from the Internet: «https://www.sciencedirect.com/science/article/pii/S0164121223000109», vol. 199, May 2023, 26 Pages.

* cited by examiner

MULTIVARIATE THREAT DETECTION FOR A CI/CD PIPELINE

BACKGROUND

A continuous integration/continuous deployment (CI/CD) pipeline is a software development approach that automates the process of integrating code changes into a shared repository, testing those changes, and deploying them to production environments quickly and regularly. The main goal of a CI/CD pipeline is to enable developers to deliver software updates more frequently and with greater reliability. This makes CI/CD pipelines very popular with many solutions and products, enabling developers to deliver the software updates. Due to the increasing popularity of CI/CD pipelines, a new threat vector has raised significant concerns for organizations relying on CI/CD pipelines. Malicious actors are now actively targeting CI/CD pipelines to exploit vulnerabilities in the automation process, potentially compromising the entire software development and deployment lifecycle.

SUMMARY

The disclosed examples are described in detail below with reference to the accompanying drawing figures listed below. The following summary is provided to illustrate some examples disclosed herein.

Example solutions protect a continuous integration/continuous deployment (CI/CD) pipeline. Examples collect data from one or more of a CI/CD pipeline execution data source and a CI/CD pipeline task data source; based on the collected data, create a feature group comprising a plurality of records, each record in the feature group representing an execution of the CI/CD pipeline; generate, using a model representing historical feature groups of the CI/CD pipeline, an anomaly score for the feature group representing the execution of the CI/CD pipeline; determine that the anomaly score is above a threshold; and upon determining that the anomaly score is above the threshold, generate an alert indicating that the collected data represents an anomalous activity.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
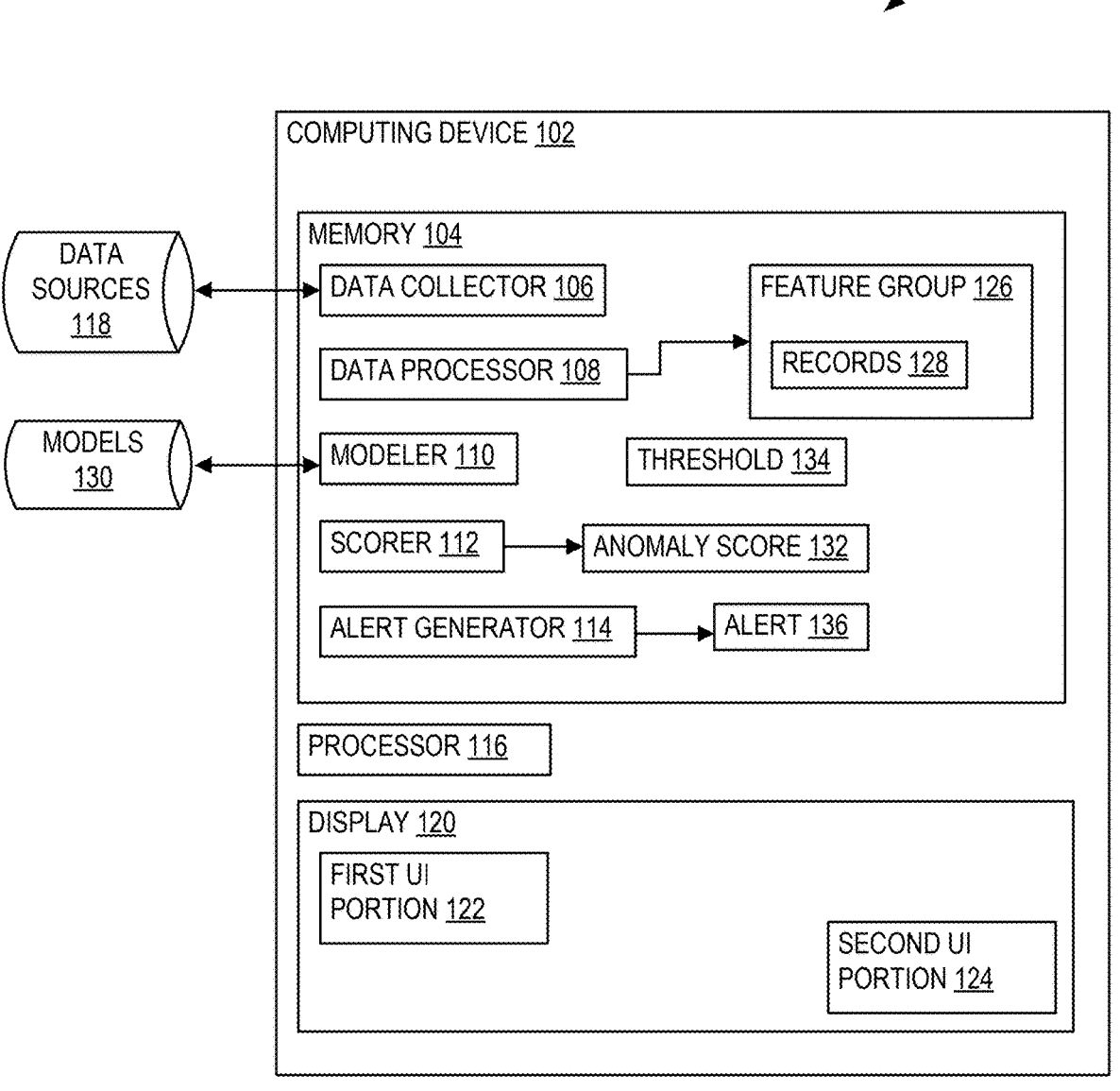
FIG. 1 illustrates an example architecture that advantageously protects continuous integration/continuous deployment (CI/CD) pipeline.

Aspects of the disclosure provide a multivariate threat detection engine for a continuous integration/continuous deployment (CI/CD) pipeline. Examples provide a comprehensive solution that continuously identifies and analyzes activities within the CI/CD pipeline, in real-time, to detect malicious activities or other threats. Examples of the disclosure detect anomalous behavior, and block or mitigate potential threats in real-time. These examples provide organizations with enhanced security measures to safeguard their CI/CD pipelines and ensure the integrity and reliability of their software development and deployment processes.

Examples of the disclosure collect relevant data, process the collected data, and trigger an alert to the organization's security team when a suspicious activity is detected. In some examples, data is collected from a CI/CD pipeline execution data source and a CI/CD pipeline task data source. Based on the collected data, a feature group (also referred to as a feature set) comprising a plurality of records is created. Each record in the feature group represents a single execution of the CI/CD pipeline. For example, a record in the CI/CD pipeline execution data source is created for each run of the CI/CD pipeline. The record in the CI/CD pipeline execution data source includes one or more of a pipeline name, an identity of a user executing the CI/CD pipeline, an internet protocol (IP) address, and a date and time of executing the CI/CD pipeline. Similarly, a record in the CI/CD pipeline task data source is created for each run of the CI/CD pipeline. The record in the CI/CD pipeline task data source includes one or more of: a task name and coding language.

An anomaly score is generated for the feature group representing the execution of the CI/CD pipeline using a model representing historical feature groups of the CI/CD pipeline. The model may be trained using historical feature groups which were created before the creation of the current feature group. In some examples, the model may be trained using the historical feature groups up to a predefined time before the current feature group (e.g., the model may be trained or updated every hour). In some examples, the current feature group is not used for generating the anomaly score for the CI/CD pipeline, to avoid calculating anomalies based on likely anomalized data.

If the anomaly score is determined to be above a threshold, an alert is generated. The alert indicates that the collected data represents an anomalous activity. In some examples, all records with an anomaly score lower than the threshold are filtered out and then a business logic may be applied. For example, the business logic may include an alert suppression rule which defines that records which are alerting on a CI/CD pipeline, which also raised an alert in the last predefined time period (e.g., six hours), will not trigger a new alert. In some examples, an alert object is created for each record. The alert object includes a title, description, and remediation steps. The alert object may be sent to the customers for taking preventive and/or remedial actions.

Examples of the disclosure are directed to risks associated CI/CD pipelines including code injection and tampering, build server compromise, credential and secrets exposure, supply chain attacks, denial of service (DoS) attack, unauthorized access to source code, and misconfiguration and human error, etc. In a code injection and tampering scenario, attackers may attempt to inject malicious code into the CI/CD pipeline, leading to unauthorized access, data breaches, or the introduction of backdoors into the deployed software. In a build compromise scenario, the build server, which plays a crucial role in the CI/CD pipeline, is a prime target for attackers. A compromised build server could lead to the distribution of infected software packages or unauthorized code modifications.

In a credential and secrets exposure scenario, if proper security measures are not in place, sensitive credentials and secrets used in the CI/CD process may be exposed, enabling attackers to gain unauthorized access to various systems and services associated with the CI/CD pipeline. In a supply chain attack scenario, attackers may target the dependencies and external libraries utilized in the CI/CD pipeline, introducing malicious code into the software supply chain, leading to compromised final products. In a DoS attack scenario, a successful DoS attack against a CI/CD pipeline can disrupt the development and deployment process, leading to significant business disruption.

In some examples, an attacker attempts to gain unauthorized access to the source code repositories integrated into the CI/CD pipeline, leading to the exposure of sensitive intellectual property or introducing unauthorized changes to the codebase. In some other examples, human error, such as misconfigurations in CI/CD tools and settings, inadvertently expose the pipeline to potential risks, making it easier for attackers to exploit vulnerabilities.

Examples of the disclosure address these risks to the CI/CD pipelines by advantageously detecting anomalous behavior, and blocking or mitigating potential threats, in real-time. For example, some traditional log-based solutions focus on individual log entries or events, which can make it challenging to detect complex, multivariate attack patterns that span multiple events. In contrast, examples of the disclosure employ advanced multivariate data analysis techniques that correlate various data points across the CI/CD pipeline, enabling the identification of sophisticated attack patterns that might otherwise go unnoticed. This comprehensive analysis enhances the accuracy of threat detection, reducing false positives and negatives, and overall providing enhanced security. This improves the functioning of the underlying devices in the CI/CD pipeline.

In some examples, anomaly detection and behavior profiling are provided. While a traditional log may provide insights into known patterns of attacks, it is difficult to use the log to identify new or previously unseen attack vectors. In contrast, examples of the disclosure incorporate anomaly detection and behavior profiling capabilities, which allow a threat detection engine to learn the normal patterns of activity within the CI/CD pipeline, for later comparison with input patterns of activity to detect an anomaly. For example, when deviations from these normal patterns of activity occur, the threat detection engine flags them as potential security threats, even if they do not match any known attack signatures.

In some examples, deeper integration and contextual awareness is implemented for the CI/CD pipelines. While logs can provide valuable information, they often lack the context needed to understand the entire CI/CD pipeline ecosystem. In contrast, examples of the disclosure integrate deeply into the CI/CD toolchain to gain access to metadata, build configurations, and deployment details for a particular CI/CD pipeline. This contextual awareness enables the threat detection engine to make more informed decisions and accurately assess the risk associated with each activity.

In another example, aspects of the disclosure provide reduced noise and improved scalability. For example, traditional log-based solutions generate a vast amount of data, leading to noise and scalability challenges. In contrast, the multivariate threat detection engine filters and processes data intelligently, thereby focusing on relevant events and activities that have a higher likelihood of being security threats. This approach reduces the volume of data to be analyzed, leading to more efficient computing resource utilization (e.g., reduced processing and memory usage) and scalability. Thus, aspects of the disclosure solve a problem unique to the domain of computing.

The various examples are described in detail with reference to the accompanying drawings. Wherever preferable, the same reference numbers are used throughout the drawings to refer to the same or like parts. References made throughout this disclosure relating to specific examples and implementations are provided solely for illustrative purposes but, unless indicated to the contrary, are not meant to limit all examples.

FIG. 1 illustrates an example architecture 100 that advantageously protects a CI/CD pipeline. Specifically, architecture 100 comprises a computing device 102 that includes a processor 116, a memory 104, and a display 120. While display 120 is shown within the computing device 102, the display 120 may not be integrated within the computing device 102 and may be coupled with the computing device 102. The display 120 shows a user interface (UI) having a first UI portion 122 and a second UI portion 124. The advantages of having different UI portions 122 and 124 will be discussed in the context of FIG. 2.

The memory 104 stores components including a data collector 106, a data processor 108, a modeler 110, a scorer 112, and an alert generator 114. The memory 104 may be located outside the computing device 102 (e.g., in the cloud) and the components may be accessed and/or executed from the cloud.

The data collector 106 collects data from data sources 118 that include a CI/CD pipeline execution data source and a CI/CD pipeline task data source. The data processor 108 analyzes the collected data and creates a feature group 126 comprising a plurality of records 128 each representing an execution of the CI/CD pipeline. The scorer 112 calculates an anomaly score 132 for the feature group representing the execution of the CI/CD pipeline. The anomaly score 132 is generated using a model representing historical feature groups of the CI/CD pipeline. If the anomaly score is determined to be above a threshold 134, an alert 136 is generated by the alert generator 114. The alert indicates that the collected data represents an anomalous activity. The model representing the CI/CD pipeline may be generated/updated by the modeler 110 and stored in the models database 130. In some examples, the model is generated/updated after the anomaly score 132 has been generated so as to avoid influence of the collected data that may be anomalized.

Figure 2:
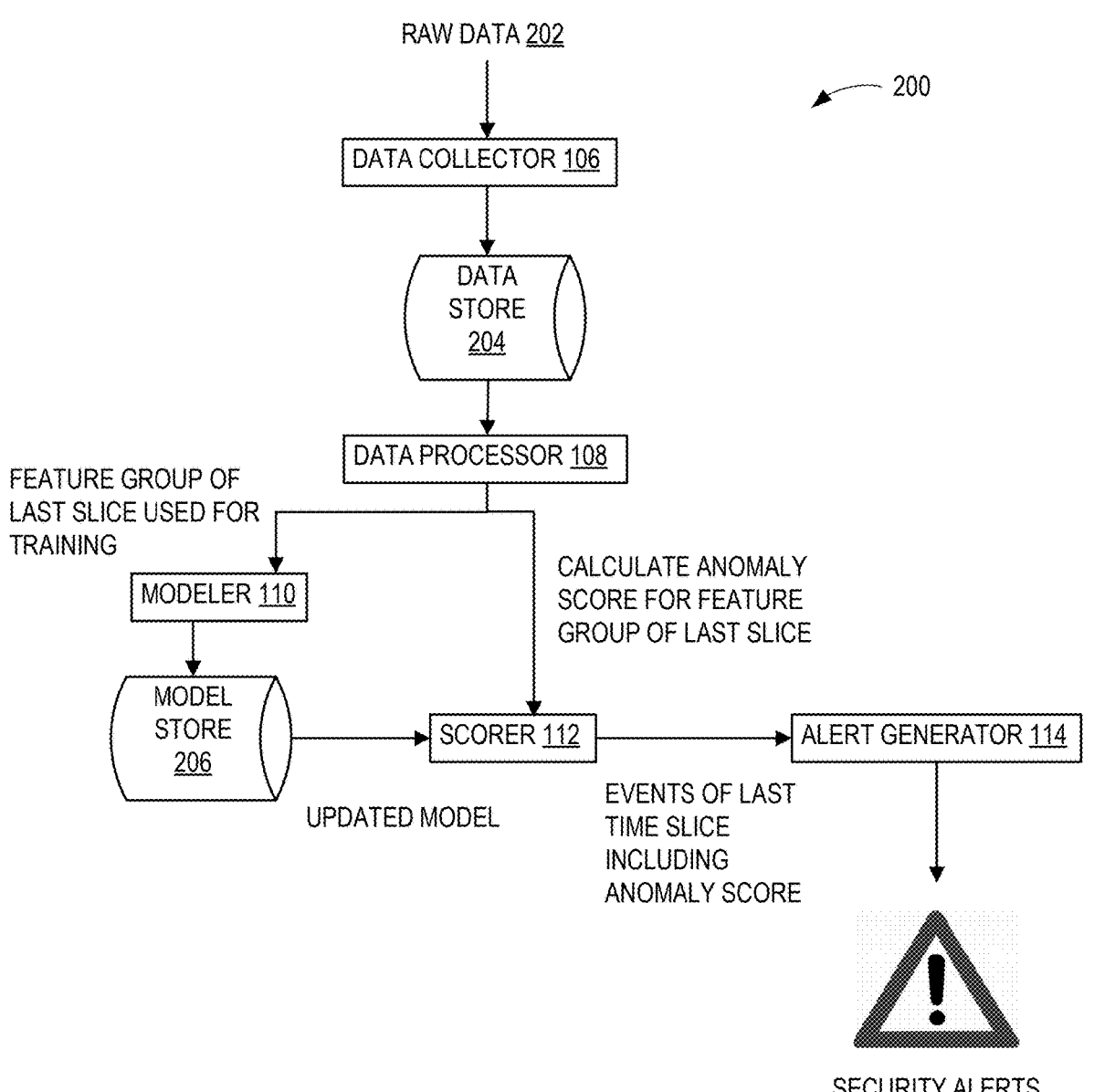
FIG. 2 illustrates an exemplary flow between different components to protect a CI/CD pipeline.

FIG. 2 illustrates an exemplary flow 200 between different components to protect a CI/CD pipeline using examples of architecture 100. The data collector 106 collects relevant raw data 202 from the required data sources 118. The raw data 106 may be in streaming form or may be available in batches. One example of a data source is a CI/CD pipeline execution data source that includes metadata of the pipeline executions ("runs"). The metadata includes, but is not limited to, a pipeline name, an identity of a user executing the CI/CD pipeline, an internet protocol (IP) address, and a date and time of executing the CI/CD pipeline. Another example of a data source is a CI/CD pipeline task data source that includes the pipeline task information (e.g., names of the tasks or the coding language of tasks).

The data collected by the data collector 106 may be stored in the system's data-store 204 and/or may be sent directly to the data processor 108. The data processor 108 receives the data collected by the data collector 106 and performs pre-processing and feature-engineering. For example, the data processor 108 performs data cleaning, builds machine learning (ML) features such as number of tasks from the tasks information collected by the data collector 106, aggregates to a certain point of view (e.g., user based, repository based, etc.), and calculates features per every aggregate level (e.g., geo-location, type of actions, repository used, etc.). The outcome of the data processor 108 is a series of feature groups. A feature group is created for each run of the CI/CD pipeline. The feature group may include multiple records each representing a single execution of the CI/CD pipeline.

The modeler 110 is a component that learns patterns in the collected data. The modeler 110 uses the feature group created by the data processor 108 to build a model representation for each CI/CD pipeline. The model is an entity which encapsulates the information of the CI/CD pipeline. The model may be a profile-based model that uses predetermined rules, or a machine learning (ML) based model. The profile-based model is defined by properties and thresholds, or other criteria. For example, the properties of the profile-based model include a list of all countries the pipeline was executed from, and a list of all security outcomes, such as remote code execution (RCE) vulnerabilities.

An ML based model is a model that is created by an ML algorithm. For example, the model may be created using anomaly detection techniques on the feature group created by the data processor 108, based on an Isolation Forest algorithm or a Density-Based Spatial Clustering of Applications with Noise (DBSCAN) algorithm. The modeler 110 is executed (e.g., on a schedule) and generates a model or profile for each pipeline entity. Memory of the modeler 110 can be "infinite" with an exponential decay, or with a look back period (e.g., last 30 days). The feature group created by the data processor 108 may be used by the modeler 110 for training and/or updating of the model. The trained models are stored in the model store 206.

An anomaly score is generated by the scorer 112 for the feature group (e.g., the feature group of the last slice or run of the CI/CD pipeline) created by the data processor 108 using a model stored in the model store 206. The scorer 112 receives updated data from the most recent time slice created by the data processor 108, together with an updated model or profile calculated by the modeler 110. The scorer 112 generates an anomaly score for each activity or other event in the records of the feature group. In some examples, the modeler 110 is executed after the scorer 112, in the same pipeline or another pipeline, to avoid calculating anomalies based on anomalized data.

An example of a profile-based scorer 112, with reference to the profile-based modeler 110, is next described. A pipeline 'P' has a profile which shows execution from two countries, France and Italy, and with an empty list of RCE. In this example, the data from the last hour (e.g., last time-slice) also includes a run of pipeline 'P' executed from China and contains an RCE vulnerability. The scorer 112 creates an anomaly score for this event. For example, 5 points for a new country and 10 points for a new RCE vulnerability, are given. Thus, the anomaly score of the event in this example is 15. This anomaly score is sent to the alert generator 114 to consider for generating a security alert.

An example of an ML based scorer 112 with reference to the ML based model of the modeler 110, is next described. A pipeline 'P' has an isolation-forest ML model. The new time slice data is sent to the existing trained model as an inference. The model returns results (e.g., an anomaly score) which the scorer 112 sends to the alert generator 114 to consider for generating a security alert. After the model returns the results, the new time slice data is used to retrain the existing isolation-forest ML model to be used in the next iteration.

Once an anomaly score is available (e.g., from the profile-based scorer or the ML based scorer), the alert generator 114 uses the anomaly score to consider whether to generate a security alert. For example, if an activity or other event is "anomalous enough" (e.g., the anomaly score is larger than, or above, a threshold, such as larger than 11), the activity is converted to an alert. In some examples, the anomaly score is correlated with other signals, such as a signal to take an automated action to generate a new, stronger password. As another example, if the other signal is a new user who executed the pipeline, the anomaly score may be increased. The alert generator 114 has logic to decide which anomalies should be triggered as alerts, and which should not trigger an alert. For example, in addition to having a high anomaly score, the alert generator 114 checks if there were past alerts in the last 24 hours and suppresses alerts if there were any. In this way, the alert generator 114 does not unnecessarily overwhelm a user with repeated alerts for the same issue or event. In other examples, the alert is raised only if there was another anomalous signal on a related repository.

Examples of the disclosure advantageously provide a multivariate threat detection engine that continuously monitors all aspects of the CI/CD pipeline, including code changes, build processes, and deployment activities. By identifying and mitigating potential threats in real-time, examples of the disclosure significantly reduce the risk of security breaches and data compromises. For example, the threat detection engine helps in detecting unauthorized access attempts to source code repositories and prevents data leaks, ensuring that customers' valuable intellectual property remains secure and confidential. Thus, the customers can proactively defend against DoS attacks and other threats, ensuring continuous business operations and minimal disruptions.

In some examples, the multivariate threat detection engine helps in demonstrating compliance with regulatory requirements and standards, making it easier for the organizations and customers to pass security audits and assessments. In some examples, aspects of the disclosure monitor dependencies and external libraries integrated into the CI/CD pipeline that help in detecting and preventing supply chain attacks, thus safeguarding the customers' software supply chain from compromise. Thus, by proactively implementing aspects of the disclosure, customers reduce their overall cybersecurity expenditure.

Figure 3:
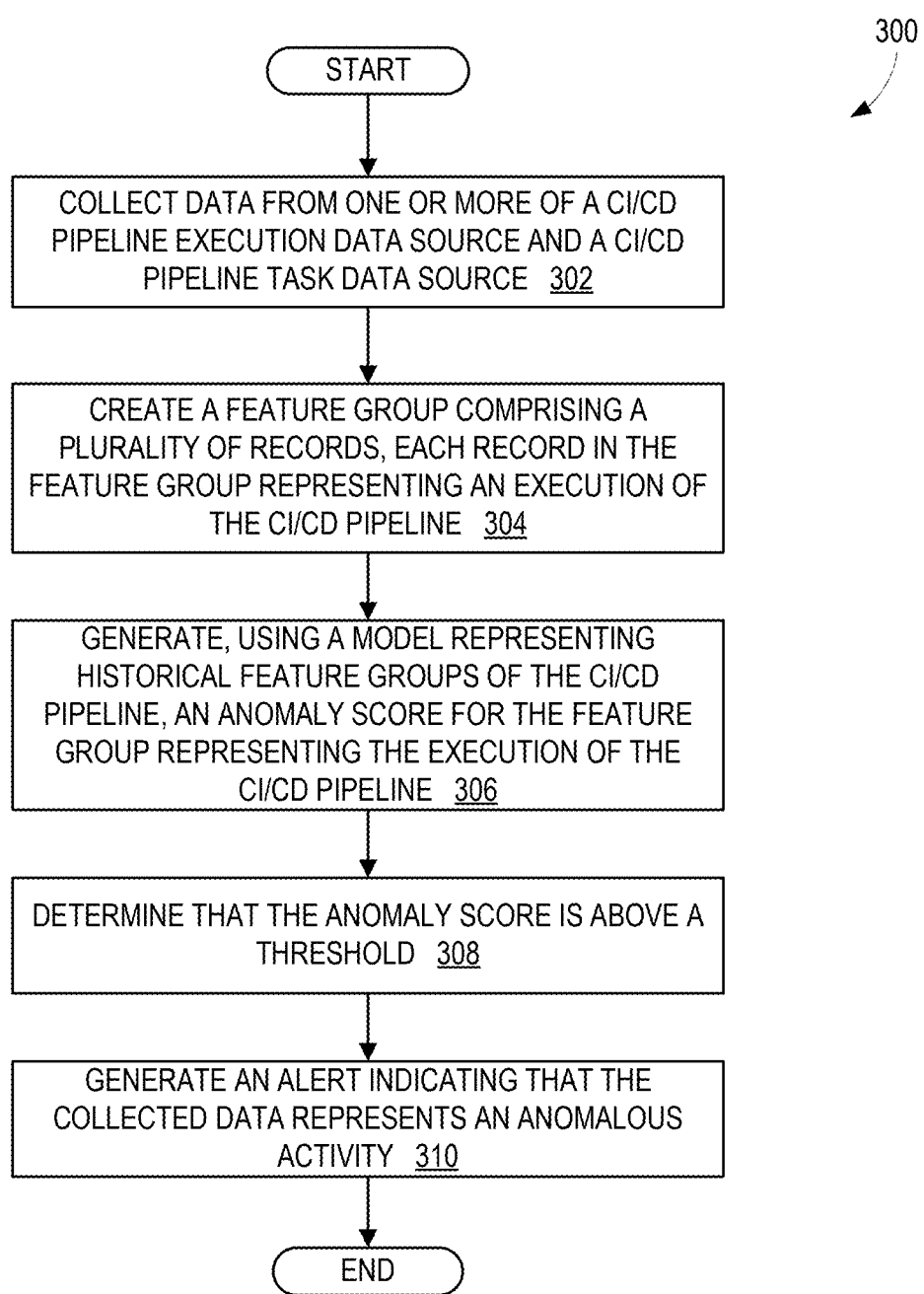
FIG. 3 shows a flowchart illustrating exemplary operations that may be performed in an example architecture, such as that of FIG. 1.

FIG. 3 shows a flowchart illustrating exemplary operations that may be performed by an example architecture, such as architecture 100 in FIG. 1. In some examples, operations described for flowchart 300 are performed by computing device 400 of FIG. 4. Flowchart 300 commences with collecting data from one or more of a CI/CD pipeline execution data source and a CI/CD pipeline task data source, in operation 302. For example, the data collector 106 runs on a first frequency or interval (e.g., every 5 minutes) and collects data from the data sources 118.

In operation 304, a feature group comprising a plurality of records is created based on the collected data. Each record in the feature group represents an execution of the CI/CD pipeline. For example, once the data is collected, the data processor 108 is triggered to create a feature group. Example features or properties of the record in the feature group include:

(1) Day of week—A categorical feature (e.g., Monday-Sunday), created from the execution date, (2) Time of the day—A categorical feature (e.g., extended work hours, outside of work hours), created from the execution time, (3) Location—A categorical feature, created by mapping an IP address to a geo-location, (4) Autonomous System Number (ASN)—A categorical feature, created by mapping the IP address to an ASN (e.g., Internet provider), (5) Executing identity—A categorical feature, created from the executing identity (e.g., the identity of the user executing the CI/CD pipeline), (6) Tasks—A list of strings, including a list of task names executed in the pipeline run, and (7) Coding languages—A list of strings, including a list of coding languages executed in the pipeline run.

The exemplary feature group may be represented by a table, where each row represents a single execution in the last five-minute interval (e.g., same as the interval of data collection).

In operation 306, an anomaly score is generated, using a model representing historical feature groups, for the feature group representing the execution of the CI/CD pipeline. For example, the scorer 112 receives the feature group every five minutes when the feature group is created. The scorer 112 receives as input (1) the last five minutes feature group and (2) the model or profile updated by the modeler 110 from the previous hour. The scorer 112 calculates an anomaly score for each record in the feature group, for example, by counting a quantity or number of anomalous features.

In operation 308, the anomaly score is determined to be above a threshold. In operation 310, based on the anomaly score being above a threshold, an alert is generated indicating that the collected data, from the CI/CD pipeline execution data source and/or the CI/CD pipeline task data source, represents an anomalous activity. For example, the alert generator 114 filters out all records with an anomaly score lower than a defined threshold. Thus, the computing device 102 has to process (e.g., display) a lesser number of alerts, thereby requiring a lesser number of operations such as updating the UI (e.g., the first UI portion 122 or the second UI portion 124) on the display 120, thereby reducing processing resource requirements.

The alert generated in operation 310 may be displayed in a UI of the display 120. An alert having higher importance or more severity (e.g., a severity above a first threshold such as 90) may be displayed in a first UI portion 122. An alert having lesser importance or less severity (e.g., a severity below the first threshold and above a second threshold such as 70) may be displayed in a second UI portion 124. In some examples, if an alert having severity above the first threshold is not there, another alert of severity below the first threshold and above a second threshold may be displayed in the first UI portion 122. In some other examples, if an alert having severity above the first threshold is displayed in the first UI portion 122 for a threshold amount of time, and another alert having severity above the first threshold is generated, the alert is automatically moved from the first UI portion 122 to the second UI portion 124, while the other alert is shown in its place in the first UI portion 122.

In some examples, upon receiving the alert, a security mitigation action is automatically performed. This may include an automated action taken to block the data from executing on the computing device 102. For example, the source of the data (e.g., the IP address) is blocked and no further data is collected from this blocked IP address. The automated action may be taken based on earlier known actions taken by the user of the computing device 102 upon receiving a similar alert (e.g., from a different IP address). Other security mitigation actions are within the scope of the disclosure.

In some examples, the modeler 110 may be trained and updated at a second frequency or interval (e.g., once an hour). Thus, the modeler 110 holds a representation for each pipeline built using its historical information, and the feature group created by the data processor 108 of the last hour (e.g., 12 feature groups at 5 minute intervals). The modeler 110 uses the historical information and the feature group of the last hour to retrain the model and/or update the profile. In some examples, the model of each pipeline is a profile which contains historical information of the features. The features below are with respect to an example order of the features in the data processor 108:

(1) List of 'Day of week' with usage information for number of executions of each day. An example for a state is [Mon-1084, Tue-1145, Wed-1003, Thu-998, Fri-874, Sat-0, Sun-1]. This example shows a behavior of a pipeline executed mainly during workdays. In this example, execution during the weekend might be suspicious.

(2) List of 'Time of the day' with usage information. A state example is [7 am to 7 pm 6834, 7 μm to 7 am-14]. This example shows a behavior of a pipeline executed mainly during working hours. In this example, execution during the night (e.g., outside working hours) might be suspicious.

(3) List of locations with usage information. A state example is [USA-5123, France-1222, England-1333]. This example shows a pipeline where the development team is working from USA and EUR. In this example, execution from Asia or Africa might be suspicious.

(4) List of ASN with usage information. A state example is [AT&T-3633, Google-2111, Quantil Networks Inc-2]. In this example, execution from ASN other than AT&T and Google might be suspicious.

(5) List of identities with usage information. A state example is [DevTeam1-1034, DevTeam2-590, SusTeam-1]. In this example, execution from identities other than DevTeam1 and DevTeam2 might be suspicious.

(6) List of tasks with usage information. A state example is [Task1-2465, Task2-5198, Task3-2]. In this example, execution of task3, which is executed only twice, might be suspicious.

(7) List of coding languages with usage information. A state example is [C++-4196, C#-1943, Python-1]. In this example, language Python is seen only once might be suspicious.

Continuing with the example of Day of Week, the scorer 112 calculates the anomaly score in the following exemplary ways. For Day of week, given the numbers in the example of the modeler 110 above, the probability for Mon is $1084/(1084+1145+1003+998+874+1)=21\%$. Similarly, the probability for Sun is 0.02%. If the value of the record is Mon, it is larger than 5% and contributes 0 to the anomaly score. However, if the value is Sun, it is lower than 5% and contributes 1 to the anomaly score.

Similar logic may be applied to the other features such as Time of the Day, etc. A counter value for each feature may be added to each record. Thus, a record with multiple anomalous features is assigned a higher anomaly score.

After the anomaly score is generated, the model representing the CI/CD pipeline may be updated using the feature group. Thus, the data may be collected at a first frequency (e.g., every five minutes) and the model be updated at a second frequency (e.g., one hour).

Additional Examples

An example system comprises: a processor; and a computer-readable medium storing instructions that are operative upon execution by the processor to: collect data from one or more of a CI/CD pipeline execution data source and a CI/CD pipeline task data source; based on the collected data, create a feature group comprising a plurality of records, each record in the feature group representing an execution of the CI/CD pipeline; generate, using a model representing historical feature groups of the CI/CD pipeline, an anomaly score for the feature group representing the execution of the CI/CD pipeline; determine that the anomaly score is above a threshold; and upon determining that the anomaly score is above the threshold, generate an alert indicating that the collected data represents an anomalous activity.

An example computer-implemented method comprises: collecting data from one or more of a CI/CD pipeline execution data source and a CI/CD pipeline task data source; based on the collected data, creating a feature group comprising a plurality of records, each record in the feature group representing an execution of the CI/CD pipeline; generating, using a model representing historical feature groups of the CI/CD pipeline, an anomaly score for the feature group representing the execution of the CI/CD pipeline; determining that the anomaly score is above a threshold; and upon determining that the anomaly score is above the threshold, generating an alert indicating that the collected data represents an anomalous activity.

One or more example computer storage devices have computer-executable instructions stored thereon, which, on execution by a computer, cause the computer to protect a Continuous Integration/Continuous Deployment (CI/CD) pipeline by performing operations comprising: collecting data from one or more of a CI/CD pipeline execution data source and a CI/CD pipeline task data source; based on the collected data, creating a feature group comprising a plurality of records, each record in the feature group representing an execution of the CI/CD pipeline; generating, using a model representing historical feature groups of the CI/CD pipeline, an anomaly score for the feature group representing the execution of the CI/CD pipeline; determining that the anomaly score is above a threshold; and upon determining that the anomaly score is above the threshold, generating an alert indicating that the collected data represents an anomalous activity.

Alternatively, or in addition to the other examples described herein, examples include any combination of the following:

upon generating the anomaly score, update, using the feature group, the model representing the CI/CD pipeline;

wherein the data is collected at a first frequency and the model is updated at a second frequency, the first frequency being larger than the second frequency;

wherein a record in the CI/CD pipeline execution data source is created for each run of the CI/CD pipeline, the record including one or more of: a pipeline name, an identity of a user executing the CI/CD pipeline, an internet protocol (IP) address, and date and time of executing the CI/CD pipeline;

wherein a record in the CI/CD pipeline task data source is created for each run of the CI/CD pipeline, the record including one or more of: a task name and coding language;

displaying the alert in a user interface (UI); and wherein the alert is displayed in a first portion of the UI or a second portion of the UI based on a severity of the alert.

While the aspects of the disclosure have been described in terms of various examples with their associated operations, a person skilled in the art would appreciate that a combination of operations from any number of different examples is also within scope of the aspects of the disclosure.

Example Operating Environment

Figure 4:
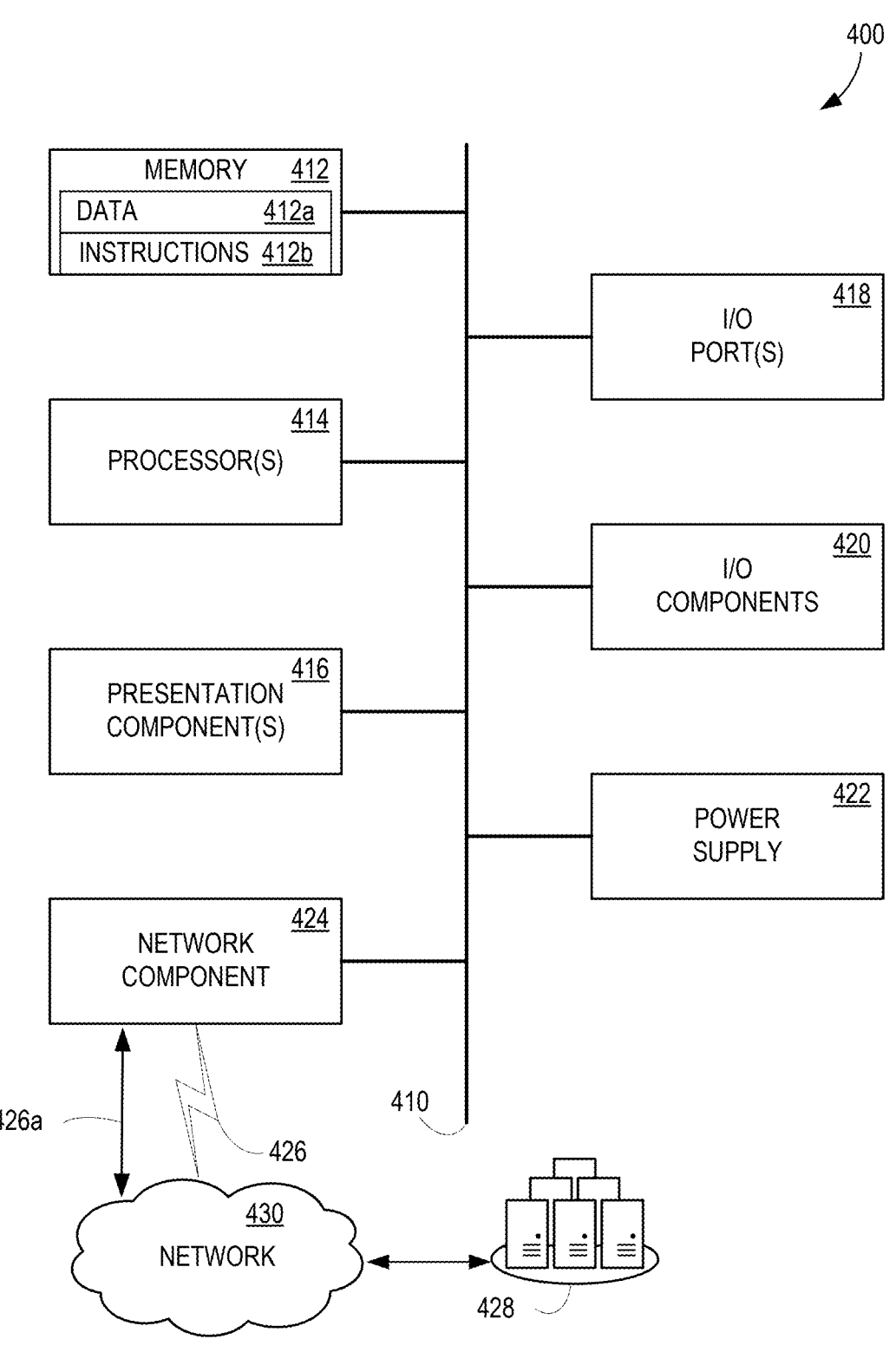
FIG. 4 shows a block diagram of an example computing device suitable for implementing some of the various examples disclosed herein.

FIG. 4 is a block diagram of an example computing device 400 (e.g., a computer storage device) for implementing aspects disclosed herein, and is designated generally as computing device 400. In some examples, one or more computing devices 400 are provided for an on-premises computing solution. In some examples, one or more computing devices 400 are provided as a cloud computing solution. In some examples, a combination of on-premises and cloud computing solutions are used. Computing device 400 is but one example of a suitable computing environment and is not intended to suggest any limitation as to the scope of use or functionality of the examples disclosed herein, whether used singly or as part of a larger set.

Neither should computing device 400 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 400 includes a bus 410 that directly or indirectly couples the following devices: computer storage memory 412, one or more processors 414, one or more presentation components 416, input/output (I/O) ports 418, I/O components 420, a power supply 422, and a network component 424. While computing device 400 is depicted as a seemingly single device, multiple computing devices 400 may work together and share the depicted device resources. For example, memory 412 may be distributed across multiple devices, and processor(s) 414 may be housed with different devices.

Bus 410 represents what may be one or more buses (such as an address bus, data bus, or a combination thereof). Although the various blocks of FIG. 4 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 4 and the references herein to a "computing device." Memory 412 may take the form of the computer storage media referenced below and operatively provide storage of computer-readable instructions, data structures, program modules and other data for the computing device 400. In some examples, memory 412 stores one or more of an operating system, a universal application platform, or other program modules and program data. Memory 412 is thus able to store and access data 412a and instructions 412b that are executable by processor 414 and configured to carry out the various operations disclosed herein. Thus, computing device 400 comprises a computer storage device having computer-executable instructions 412b stored thereon.

In some examples, memory 412 includes computer storage media. Memory 412 may include any quantity of memory associated with or accessible by the computing device 400. Memory 412 may be internal to the computing device 400 (as shown in FIG. 4), external to the computing device 400 (not shown), or both (not shown). Additionally, or alternatively, the memory 412 may be distributed across multiple computing devices 400, for example, in a virtualized environment in which instruction processing is carried out on multiple computing devices 400. For the purposes of this disclosure, "computer storage media," "computer storage memory," "memory," and "memory devices" are synonymous terms for the memory 412, and none of these terms include carrier waves or propagating signaling.

Processor(s) 414 may include any quantity of processing units that read data from various entities, such as memory 412 or I/O components 420. Specifically, processor(s) 414 are programmed to execute computer-executable instructions for implementing aspects of the disclosure. The instructions may be performed by the processor, by multiple processors within the computing device 400, or by a processor external to the client computing device 400. In some examples, the processor(s) 414 are programmed to execute instructions such as those illustrated in the flow charts discussed below and depicted in the accompanying drawings. Moreover, in some examples, the processor(s) 414 represents an implementation of analog techniques to perform the operations described herein. For example, the operations may be performed by an analog client computing device 400 and/or a digital client computing device 400. Presentation component(s) 416 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 400, across a wired connection, or in other ways. I/O ports 418 allow computing device 400 to be logically coupled to other devices including I/O components 420, some of which may be built in. Example I/O components 420 include, for example but without limitation, a microphone, joystick, game pad, satellite dish, scanner, printer, wireless device, etc.

Computing device 400 may operate in a networked environment via the network component 424 using logical connections to one or more remote computers. In some examples, the network component 424 includes a network interface card and/or computer-executable instructions (e.g., a driver) for operating the network interface card. Communication between the computing device 400 and other devices may occur using any protocol or mechanism over any wired or wireless connection. In some examples, network component 424 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 424 communicates over wireless communication link 426 and/or a wired communication link 426a to a remote resource 428 (e.g., a cloud resource) across network 430. Various different examples of communication links 426 and 426a include a wireless connection, a wired connection, and/or a dedicated link, and in some examples, at least a portion is routed through the internet.

Although described in connection with an example computing device 400, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure do not include signals. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system operable to protect a continuous integration/continuous deployment (CI/CD) pipeline, the system comprising:

a processor; and a computer-readable medium storing instructions that are operative upon execution by the processor to:

collect data from CI/CD pipeline execution data source and a CI/CD pipeline task data source;

based on the collected data, create a feature group comprising a plurality of records, each record in the feature group representing an execution of the CI/CD pipeline;

generate, using a model representing historical feature groups of the CI/CD pipeline, an anomaly score for the feature group representing the execution of the CI/CD pipeline, the historical feature groups representing previous executions of the CI/CD pipeline;

determine that the anomaly score is above a threshold, indicating that the collected data represents an anomalous activity; and upon determining that the anomaly score is above the threshold, perform a security mitigation action.

2. The system of claim 1, wherein the instructions are further operative to:

upon generating the anomaly score, update, using the feature group, the model representing the CI/CD pipeline.

3. The system of claim 2, wherein the data is collected at a first frequency and the model is updated at a second frequency, the first frequency being larger than the second frequency.

4. The system of claim 1, wherein a record in the CI/CD pipeline execution data source is created for each run of the CI/CD pipeline, the record including one or more of: a pipeline name, an identity of a user executing the CI/CD pipeline, an internet protocol (IP) address, and a date and time of executing the CI/CD pipeline.

5. The system of claim 1, wherein a record in the CI/CD pipeline task data source is created for each run of the CI/CD pipeline, the record including one or more of: a task name and coding language.

6. The system of claim 1, wherein the instructions are further operative to display an alert in a user interface (UI).

7. The system of claim 6, wherein the alert is displayed in a first portion of the UI or a second portion of the UI, based on a severity of the alert.

8. A computer-implemented method for protecting a continuous integration/continuous deployment (CI/CD) pipeline, the method comprising:

collecting data from one or more of a CI/CD pipeline execution data source and a CI/CD pipeline task data source;

based on the collected data, creating a feature group comprising a plurality of records, each record in the feature group representing an execution of the CI/CD pipeline;

generating, using a model representing historical feature groups of the CI/CD pipeline, an anomaly score for the feature group representing the execution of the CI/CD pipeline;

determining that the anomaly score is above a threshold; and upon determining that the anomaly score is above the threshold, generating an alert indicating that the collected data represents an anomalous activity.

9. The computer-implemented method of claim 8, further comprising:

upon generating the anomaly score, updating, using the feature group, the model representing the CI/CD pipeline.

10. The computer-implemented method of claim 9, wherein the data is collected at a first frequency and the model is updated at a second frequency, the first frequency being larger than the second frequency.

11. The computer-implemented method of claim 8, wherein a record in the CI/CD pipeline execution data source is created for each run of the CI/CD pipeline, the record including one or more of: a pipeline name, an identity of a user executing the CI/CD pipeline, an internet protocol (IP) address, and a date and time of executing the CI/CD pipeline.

12. The computer-implemented method of claim 8, wherein a record in the CI/CD pipeline task data source is created for each run of the CI/CD pipeline, the record including one or more of: a task name and coding language.

13. The computer-implemented method of claim 8, further comprising displaying the alert in a user interface (UI).

14. The computer-implemented method of claim 13, wherein the alert is displayed in a first portion of the UI or a second portion of the UI, based on a severity of the alert.

15. A computer storage device having computer-executable instructions stored thereon, which, on execution by a computer, cause the computer to protect a continuous integration/continuous deployment (CI/CD) pipeline by performing operations comprising:

collecting data from one or more of a CI/CD pipeline execution data source and a CI/CD pipeline task data source;

based on the collected data, creating a feature group comprising a plurality of records, each record in the feature group representing an execution of the CI/CD pipeline;

generating, using a model representing historical feature groups of the CI/CD pipeline, an anomaly score for the feature group representing the execution of the CI/CD pipeline;

determining that the anomaly score is above a threshold; and upon determining that the anomaly score is above the threshold, generating an alert indicating that the collected data represents an anomalous activity.

16. The computer storage device of claim 15, wherein the operations further comprise:

upon generating the anomaly score, updating, using the feature group, the model representing the CI/CD pipeline.

17. The computer storage device of claim 16, wherein the data is collected at a first frequency and the model is updated at a second frequency, the first frequency being larger than the second frequency.

18. The computer storage device of claim 15, wherein a record in the CI/CD pipeline execution data source is created for each run of the CI/CD pipeline, the record including one or more of: a pipeline name, an identity of a user executing the CI/CD pipeline, an internet protocol (IP) address, and a date and time of executing the CI/CD pipeline.

19. The computer storage device of claim 15, wherein a record in the CI/CD pipeline task data source is created for each run of the CI/CD pipeline, the record including one or more of: a task name and coding language.

20. The computer storage device of claim 19, wherein the operations further comprise:

displaying the alert in a user interface (UI), wherein the alert is displayed in a first portion of the UI or a second portion of the UI, based on a severity of the alert.

\* \* \* \* \*